United States Patent
Weber

(10) Patent No.: US 11,873,773 B2
(45) Date of Patent: Jan. 16, 2024

(54) SYSTEMS AND METHODS FOR EARLY CAMSHAFT POSITION DETECTION IN AN ENCODED CRANKSHAFT SYSTEM

(71) Applicant: Honda Motor Co., Ltd., Tokyo (JP)

(72) Inventor: Philip R. Weber, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 10 days.

(21) Appl. No.: 17/589,785

(22) Filed: Jan. 31, 2022

(65) Prior Publication Data

US 2023/0243316 A1    Aug. 3, 2023

(51) Int. Cl.
  *F02D 41/22* (2006.01)
  *G01M 15/06* (2006.01)
  *F02D 41/00* (2006.01)

(52) U.S. Cl.
  CPC ......... *F02D 41/009* (2013.01); *F02D 41/222* (2013.01); *G01M 15/06* (2013.01); *F02D 2200/10* (2013.01)

(58) Field of Classification Search
  CPC ...... F02D 41/00; F02D 41/009; F02D 41/222; G01M 15/06; G01D 5/145; G01D 5/2451; G01D 5/249
  See application file for complete search history.

(56) References Cited

U.S. PATENT DOCUMENTS

| | | | |
|---|---|---|---|
| 6,341,253 B1 * | 1/2002 | Honda | G01D 5/2457 123/406.62 |
| 7,142,973 B2 * | 11/2006 | Ando | F02D 41/062 701/112 |
| 2005/0278109 A1 * | 12/2005 | Ando | F02D 41/009 701/112 |
| 2006/0157032 A1 * | 7/2006 | Hori | F02D 41/3845 123/458 |
| 2008/0017149 A1 * | 1/2008 | Kokubo | G01D 5/2457 73/114.26 |
| 2008/0215225 A1 * | 9/2008 | Nakamura | F02P 5/1506 73/114.26 |

(Continued)

FOREIGN PATENT DOCUMENTS

| | | |
|---|---|---|
| CN | 111553377 | 8/2020 |
| DE | 102020103106 | 8/2020 |

*Primary Examiner* — John Kwon
*Assistant Examiner* — Johnny H Hoang
(74) *Attorney, Agent, or Firm* — RANKIN, HILL & CLARK LLP

(57) ABSTRACT

Systems and methods for early camshaft position detection in an encoded crankshaft system are provided. In one embodiment, a method includes determining a crankshaft angular position of a crank pulse wheel based on electronic signals received from vehicle sensors. The crank pulse wheel is associated with a cycle including a first crankshaft rotation and a second crankshaft rotation. The method also includes determining a crankshaft angular position from electronic signals received from vehicle sensors. The method yet further includes receiving a sensed camshaft value for a camshaft wheel having a camshaft rotation in the cycle. The method then includes determining if the cycle is in the first crankshaft rotation or the second crankshaft rotation of the crank pulse wheel based on the crankshaft angular position of the crank pulse wheel and the sensed camshaft value.

20 Claims, 12 Drawing Sheets

(56) References Cited

U.S. PATENT DOCUMENTS

| | | | |
|---|---|---|---|
| 2013/0019668 A1* | 1/2013 | Guerrassi | F02D 35/023 |
| | | | 73/114.16 |
| 2020/0049078 A1* | 2/2020 | Oh | F02P 5/045 |
| 2020/0256706 A1 | 8/2020 | Weber | |
| 2020/0256709 A1 | 8/2020 | Weber | |
| 2020/0362779 A1 | 11/2020 | Weber et al. | |
| 2021/0017887 A1 | 1/2021 | Kelly et al. | |

* cited by examiner

FIG. 6

| Tooth Number | 314 | 316 | 318 | 320 | 322 | 324 | 326 | 328 | 330 | 332 | 334 | 336 |
|---|---|---|---|---|---|---|---|---|---|---|---|---|
| Characteristic Value | 1 | 3 | 3 | 2 | 1 | 2 | 3 | 2 | 2 | 3 | 3 | 1 |

| Tooth Number | 314 | 316 | 318 | 320 | 322 | 324 | 326 | 328 | 330 | 332 | 334 | 336 |
|---|---|---|---|---|---|---|---|---|---|---|---|---|
| Characteristic Value | 1 | 3 | 3 | 2 | 1 | 2 | 3 | 2 | 2 | 3 | 3 | 1 |

| Tooth Number | 314 | 316 | 318 | 320 | 322 | 324 | 326 | 328 | 330 | 332 | 334 | 336 |
|---|---|---|---|---|---|---|---|---|---|---|---|---|
| Characteristic Value | 1 | 3 | 3 | 2 | 1 | 2 | 3 | 2 | 2 | 3 | 3 | 1 |

802

| 314 | 316 | 318 | 320 | 322 | 324 | 326 | 328 | 330 | 332 | 334 | 336 |
|---|---|---|---|---|---|---|---|---|---|---|---|
| (3,1,1) | (1,1,3) | (1,3,3) | (3,3,2) | (3,2,1) | (2,1,2) | (1,2,3) | (2,3,1) | (3,1,2) | (2,2,3) | (2,3,3) | (3,3,1) |
| 6° | 12° | 18° | 24° | 30° | 36° | 42° | 48° | 54° | 60° | 66° | 72° |

SYSTEMS AND METHODS FOR EARLY CAMSHAFT POSITION DETECTION IN AN ENCODED CRANKSHAFT SYSTEM

BACKGROUND

A crankshaft sensor is used to determine the position and timing of an engine of a vehicle. Located in the "top end" of an engine, the camshaft controls valve operation which allows air to enter the combustion chamber and exhaust gases to escape after combustion occurs. Driven by the crankshaft, a camshaft transfers motion from the cams through various parts of the valve train (valve lifter, pushrod, valve spring, valve and tappet or rocker arm) to open and close engine valves of the vehicle. Located in the "bottom end" of an engine, the crankshaft harnesses the force of combustion (the violent burning of the air and fuel in the combustion chamber) by thrusting the pistons downward, causing the crankshaft to rotate. This rotation is the power source of an engine.

Camshaft and crankshaft gears are connected, for example, by a timing chain, timing belt, or are a mesh gear set. To control combustion, the camshaft and crankshaft gears must be indexed to work in perfect harmony. The valve timing is dependent on the type of engine. For example, a four-stroke engine operates in four stages including an intake stage, a compression stage, a power stage, and an exhaust stage. In particular, during the four-stroke combustion cycle, the crankshaft turns twice during the complete cycle, moving each piston up and down twice, while the camshaft turns once in the cycle. Accordingly, each valve will typically open one time for every two crankshaft revolutions in relation to the piston. This way, only the intake valve(s) will open on the intake stroke, both valves remain closed during the compression and combustion strokes, and only the exhaust valve(s) opens during the exhaust stroke.

BRIEF DESCRIPTION

According to one or more aspects, a system for early camshaft position detection in an encoded crankshaft system is provided. In one embodiment, the system includes a processor and a memory. The memory is configured to store instructions that when executed by the processor cause the processor to perform a method. The method includes determining a crankshaft angular position of a crank pulse wheel based on electronic signals received from vehicle sensors. The crank pulse wheel is associated with a cycle including a first crankshaft rotation and a second crankshaft rotation. The method also includes determining a crankshaft angular position from electronic signals received from vehicle sensors. The method yet further includes receiving a sensed camshaft value for a camshaft wheel having a camshaft rotation in the cycle. The method then includes determining if the cycle is in the first crankshaft rotation or the second crankshaft rotation of the crank pulse wheel based on the crankshaft angular position of the crank pulse wheel and the sensed camshaft value.

According to one or more aspects, a method for early camshaft position detection in an encoded crankshaft system is provided. The method includes identifying a tooth type for N number of teeth on a crank pulse wheel in a sliding buffer based on at least one tooth characteristic. N is a positive integer less than a total number of teeth of the crank pulse wheel. The crank pulse wheel has a first crankshaft rotation and a second crankshaft rotation in a cycle. The method also includes calculating a buffer value for the sliding buffer corresponding to the N number of teeth represented in the sliding buffer. The method further includes determining a crankshaft angular position of the crank pulse wheel based on the buffer value. The method yet further includes receiving a sensed camshaft value for a camshaft wheel having a camshaft rotation in the cycle. The method then includes determining if the cycle is in the first crankshaft rotation or the second crankshaft rotation of the crank pulse wheel based on the crankshaft angular position of the crank pulse wheel and the sensed camshaft value.

According to one or more aspects, a non-transitory computer-readable storage medium is provided for storing instructions that, when executed by a processor, cause the processor to perform a method for early camshaft position detection in an encoded crankshaft system is provided. The method includes identifying a tooth type for N number of teeth on a crank pulse wheel in a sliding buffer based on at least one tooth characteristic. N is a positive integer less than a total number of teeth of the crank pulse wheel. The crank pulse wheel has a first crankshaft rotation and a second crankshaft rotation in a cycle. The method also includes calculating a buffer value for the sliding buffer corresponding to the N number of teeth represented in the sliding buffer. The method further includes determining a crankshaft angular position of the crank pulse wheel based on the buffer value. The method yet further includes receiving a sensed camshaft value for a camshaft wheel having a camshaft rotation in the cycle. The method then includes determining if the cycle is in the first crankshaft rotation or the second crankshaft rotation of the crank pulse wheel based on the crankshaft angular position of the crank pulse wheel and the sensed camshaft value.

BRIEF DESCRIPTION OF THE DRAWINGS

FIG. 6 is a crank tooth table with a second sliding buffer according to one or more embodiments.

FIG. 7 is a crank tooth table with a third sliding buffer according to one or more embodiments.

FIG. 8 is a crank tooth map corresponding to FIGS. 4-7 according to one or more embodiments.

FIG. 9 is another crank tooth map corresponding to an example crank pulse wheel according to one or more embodiments.

FIG. 10 is an example flow diagram of a method for crankshaft tooth encoding including base reduction according to one or more embodiments.

DETAILED DESCRIPTION

Figure 1:
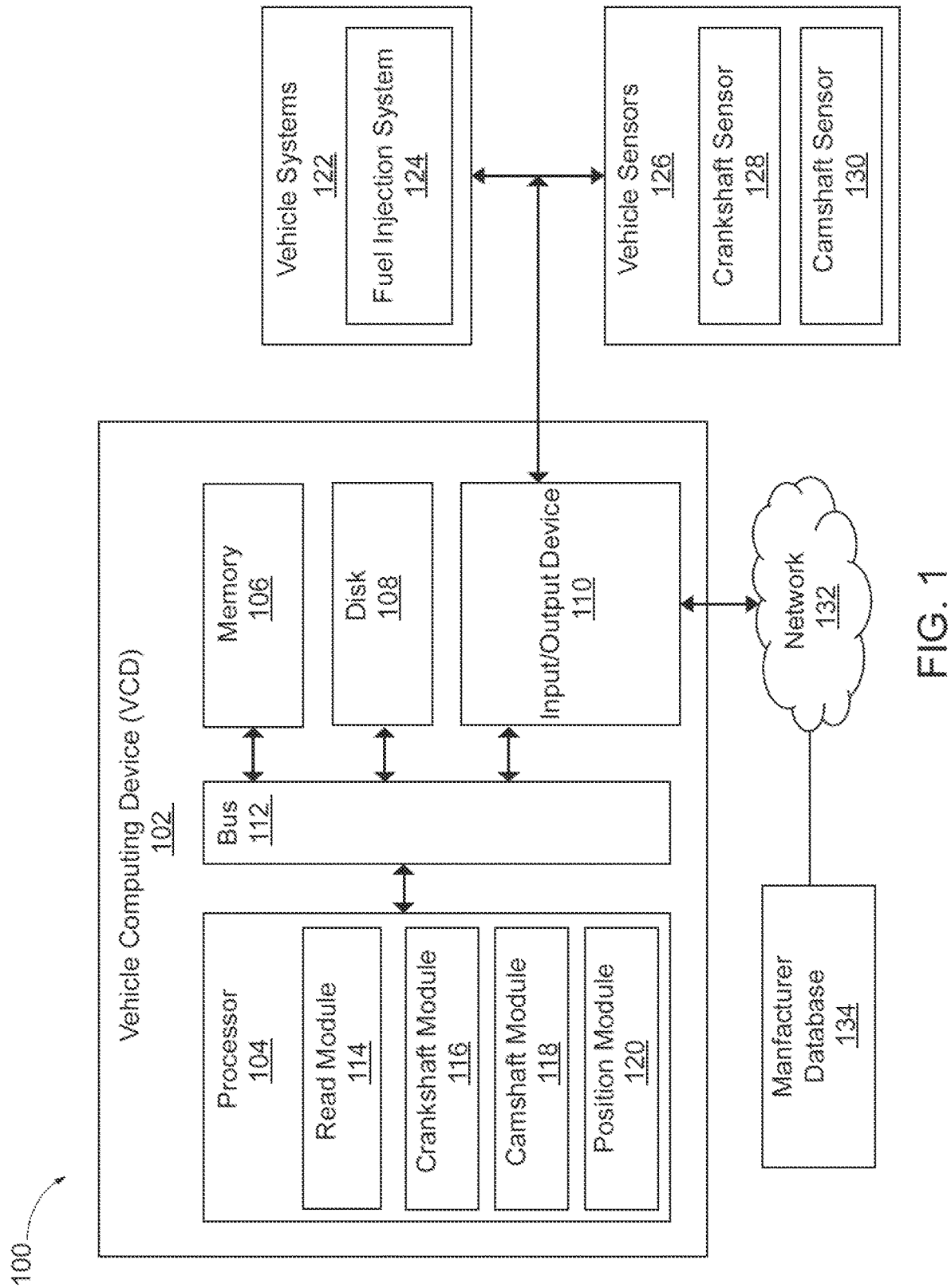
FIG. 1 is a schematic diagram of an operating environment for implementing systems and methods for early camshaft position detection in an encoded crankshaft system, according to one or more embodiments.

As discussed above, the crankshaft of the four-stroke engine turns twice, as two rotations in a cycle, and the camshaft turns once in that cycle. To perform cylinder discrimination for a four-stroke engine, it is important to determine whether the crank pulse wheel of the crankshaft is on a first rotation or a second rotation of the cycle. However, due to the slower rotation of the camshaft, it typically takes longer to determine the position of the camshaft wheel. Therefore, even if the crank pulse wheel is encoded, the system may have to wait for the position of the camshaft wheel to be determined.

The systems and methods herein determine a crankshaft angular position of the crankshaft and a position of the camshaft wheel. Based on the crankshaft angular position and the position of the camshaft wheel, the rotation of the crank pulse wheel may be identified. In one embodiment, the crankshaft angular position of the crank pulse wheel is determined based on a tooth characteristic of a number of teeth on the crank pulse wheel.

The position of the camshaft wheel is also determined. In one example, the camshaft wheel may have one or more bosses that extend from the camshaft wheel in an axial direction. The one or more bosses may be positioned on a face of the camshaft wheel, extending in a circumferential direction corresponding to 180° of the camshaft wheel. Accordingly, half of the camshaft wheel may have a boss while the other half of the camshaft wheel does not.

Because the camshaft wheel turns once in the cycle for the two rotations of the crank pulse wheel, the one or more bosses may be positioned such that a first rotation of the crank pulse wheel is associated with the presence of a boss, while the second rotation of the crank pulse wheel is associated with the absence of a boss. For example, suppose that the crankshaft angular position of the crank pulse wheel is 36° and a camshaft sensor detects a boss on the camshaft wheel, then crankshaft pulse wheel is in the first rotation. Conversely, suppose that the crankshaft angular position of the crank pulse wheel is 36° and a camshaft sensor does not detect a boss on the camshaft wheel, then crankshaft is in the second rotation. Accordingly, the rotation of the crank pulse wheel in the cycle may be determined based on a crank pulse signal detected based on the position of the crank pulse wheel and a camshaft signal detected based on the position of the camshaft wheel without waiting for the slower rotation of the camshaft wheel.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

DEFINITIONS

The following includes definitions of selected terms employed herein. The definitions include various examples and/or forms of components that fall within the scope of a term and that may be used for implementation. The examples are not intended to be limiting.

A "bus," as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a mobile programmable agent bus that interconnects components inside a mobile programmable agent using protocols such as Media Oriented Systems Transport (MOST), Controller Area network (CAN), Local Interconnect Network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, mobile programmable agent, computing device, infrastructure device, security device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicle-to-everything (V2X) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

A "database," as used herein may refer to table, a set of tables, a set of data stores and/or methods for accessing and/or manipulating those data stores. Some databases may be incorporated with a disk as defined below.

A "disk," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

A "memory," as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications may be sent and/or received. An operable connection may include a wireless interface, a physical interface, a data interface, and/or an electrical interface.

A "processor" as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to a hybrid vehicle partially powered by one or more electric motors powered by an electric battery. Further, the term "vehicle" may include vehicles that are automated or non-automated with predetermined paths or free-moving vehicles.

"Vehicle control system" and/or "vehicle system," as used herein may include, but is not limited to, any automatic or manual systems that may be used to enhance the vehicle, driving, and/or safety. Exemplary vehicle systems include, but are not limited to: an engine control system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), an electronic pretensioning system, a monitoring system, a vehicle suspension system, a sensory system, an interior or exterior camera system among others.

I. System Overview

Figure 2:
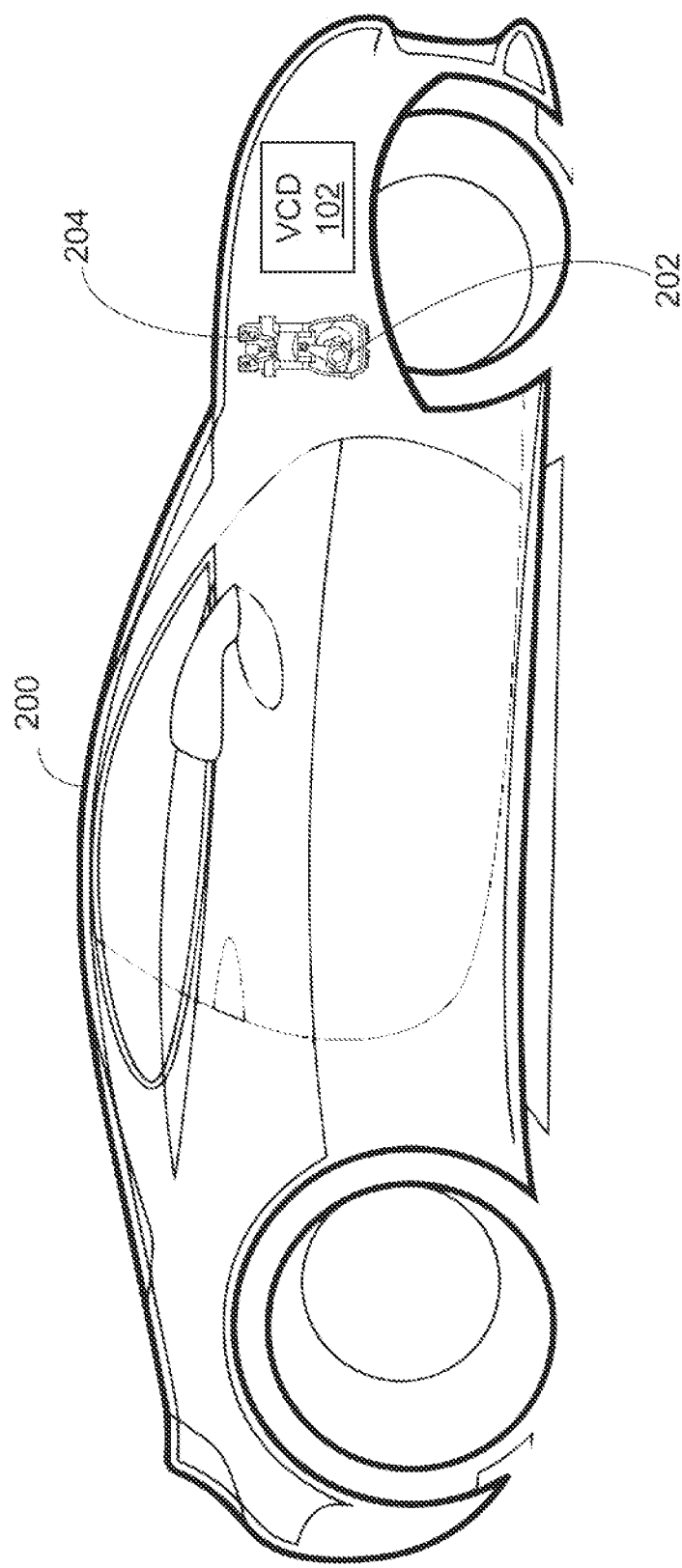
FIG. 2 is a schematic diagram of a vehicle having camshaft wheel and a crank pulse wheel, according to one or more embodiments.

Referring now to the drawings, wherein the showings are for purposes of illustrating one or more exemplary embodiments and not for purposes of limiting same. FIG. 1 is a schematic diagram of an operating environment 100 for early camshaft position detection in an encoded crankshaft system. The components of operating environment 100, as well as the components of other systems, hardware architectures, and software architectures discussed herein, may be combined, omitted, or organized into different architectures for various embodiments. Further, the components of the operating environment 100 may be implemented with or associated with a vehicle 200 having a crank pulse wheel 202 and a camshaft wheel 204, as shown in FIG. 2.

In the illustrated embodiment of FIG. 1, the operating environment 100 includes a vehicle computing device (VCD) 102 with provisions for processing, communicating and interacting with various components of a vehicle, such as vehicle 200, and other components of the operating environment 100. In one embodiment, the VCD 102 may be implemented in the vehicle 200, for example, as part of a telematics unit, a head unit, a navigation unit, an infotainment unit, an electronic control unit, among others. In other embodiments, the components and functions of the VCD 102 may be implemented remotely from the vehicle 200, for example, with a portable device (not shown) or another device connected via a network (e.g., a network 132).

Generally, the VCD 102 includes a processor 104, a memory 106, a data store 108, and an input/output (I/O) interface 110, which are each operably connected for computer communication via a bus 112 and/or other wired and wireless technologies. The I/O interface 110 provides software and hardware to facilitate data input and output between the components of the VCD 102 and other components, networks, and data sources, which will be described herein. Additionally, the processor 104 includes a read module 114, a crankshaft module 116, a camshaft module 118, and a position module 120 for early camshaft position detection in an encoded crankshaft system, facilitated by the components of the operating environment 100.

The VCD 102 is also operably connected for computer communication (e.g., via the bus 112 and/or the I/O interface 110) to one or more vehicle systems 122. The vehicle systems 122 may include, but are not limited to, any automatic or manual systems that may be used to enhance the vehicle 200, driving, and/or safety. Here, as an example, the vehicle systems 122 include a fuel injection system 124. The fuel injection system 124 delivers fuel to a combustion engine of the vehicle 200 based on synchronized timing to propel the vehicle 200.

The vehicle systems 122 include and/or are operably connected for computer communication to various vehicle sensors 126. The vehicle sensors 126 provide and/or sense information associated with the vehicle 200, the vehicle environment, and/or the vehicle systems 122. The vehicle sensors 126 include a crankshaft sensor 128 for detecting the teeth on a crank pulse wheel 202. In some embodiments, the crankshaft sensor 128 is a Hall Effect sensor with a digital output or a variable reluctance sensor having an analog output. In particular, the crankshaft sensor 128 may measure the magnetic flux corresponding to the teeth on the crank pulse wheel 202.

Figure 3:
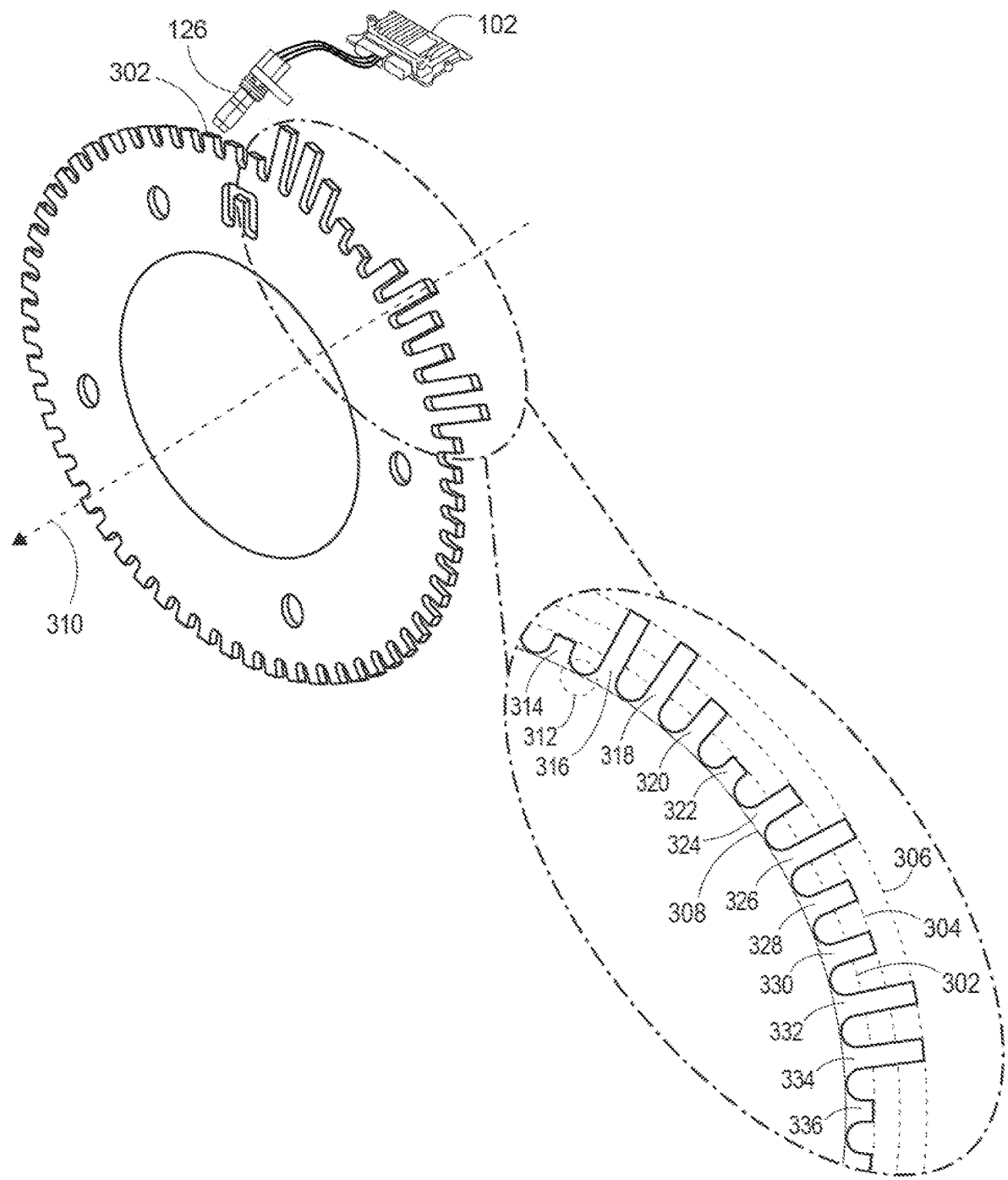
FIG. 3 is a schematic diagram of a crankshaft pulse wheel having multiple sensory axes according to one or more embodiments.

Turning to FIG. 3, the crank pulse wheel 202 has a total number of teeth that extend radially from the main body of the crank pulse wheel 202. A tooth of the total number of teeth may have a profile that is polyhydric, conical, spherical, helical, beveled, crowned, cantilevered, angled, rounded, and/or irregular shaped, among others. The profile of the teeth may have predefined tooth characteristics that make the teeth of the crank pulse wheel 202 differentiable by the crankshaft sensor 128. The tooth geometry may include the size and/or shape of the teeth on the crank pulse wheel 202 or physical geometric features of the crank pulse wheel 202 itself. For example, the tooth geometry may include height, irregular formations (e.g., outcroppings, protrusions, nodules, etc.), thickness, depth, surface angle, surface patterning, voids, holes, cavities, and/or guides, among others. The tooth characteristics may also include material-based differences, differences in radiation profiles of the teeth, spectral differences on the electromagnetic spectrum, and/or optical differences, among others that may be sensed by the vehicle sensors 126 and/or the crankshaft sensor 128.

Suppose the at least one tooth characteristic is a height of the teeth of the crank pulse wheel 202. The crankshaft sensor 128 may detect the height differential between the teeth. The height may include a first height 302, a second height 304, and a third height 306 measured from a baseline 308. The radial distance between the baseline 308 and the center point 310 of the crank pulse wheel 202 forms the main body of the crank pulse wheel 202. Gaps are formed between the teeth, such as a gap 312 between the first tooth 314 and the second tooth 316.

The difference in the heights allows the crankshaft sensor 128 to differentiate between the teeth of the crank pulse wheel 202. In one embodiment, the read module 114 may receive the height differential as a characteristic value. For example, the characteristic value for the first height 302 is (1), the characteristic value for the second height 304 is (2), and the characteristic value for the third height 306 is (3). Accordingly, the first tooth 314 extends to the first height 302 (1), the second tooth 316 extends to the third height 306 (3), a third tooth 318 extends to the third height 306 (3), a fourth tooth 320 extends to the second height 304 (2), a fifth tooth 322 extends to the first height 302 (1), a sixth tooth 324 extends to the second height 304 (2), a seventh tooth 326 extends to the third height 306 (3), an eighth tooth 328 extends to the second height 304 (2), a ninth tooth 330 extends to the second height 304 (2), a tenth tooth 332 extends to the third height 306 (3), an eleventh tooth 334 extends to the third height, and twelfth tooth 336 extends to the first height 302 (1). Accordingly, in addition to differentiating the teeth of the crank pulse wheel 202, the crankshaft sensor 128 detects a characteristic of the teeth of the crank pulse wheel 202 as it turns.

The vehicle sensors 126 also include a camshaft sensor 130 for detecting the bosses on a crank pulse wheel 202. In some embodiments, the camshaft sensor 130 is a Hall Effect sensor with a digital output or a variable reluctance sensor having an analog output. In particular, the camshaft sensor 130 may measure the magnetic flux corresponding to the bosses on the camshaft wheel 204.

Figure 4:
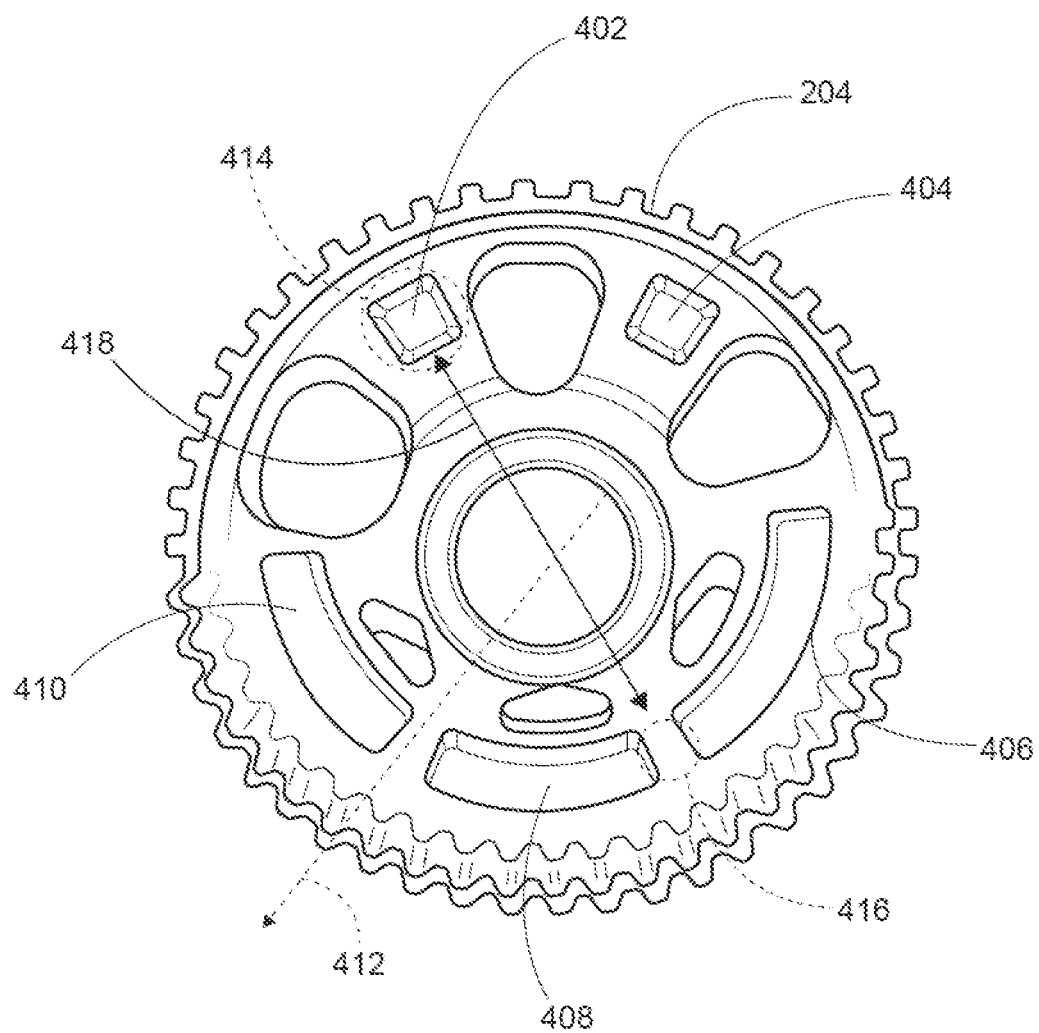
FIG. 4 is a schematic diagram of a camshaft wheel having multiple sensory axes according to one or more embodiments.

Turning to FIG. 4, the camshaft wheel 204 has a total number of bosses such as a first boss 402, a second boss 404, a third boss 406, a fourth boss 408, and a fifth boss 410. The bosses 402-410 are protuberances in the face of the camshaft wheel 204 that extend in an axial direction from the main body of the camshaft wheel 204.

The bosses 402-410 extend around the main body of the camshaft wheel 204 in a circumferential direction corresponding to 180° of the camshaft wheel 204. The bosses 402-410 may be contiguous or non-contiguous. For example, the first boss 402 may circumferentially extend for 15° of the 360° of the camshaft wheel 204. Likewise, the second boss 404 may circumferentially extend for 15° of the 360° of the camshaft wheel 204. The first boss 402 may be separated from the second boss 404 by a portion of the of the main body of the camshaft wheel 204. For example, the main body forms a face plane of the camshaft wheel 204. The bosses 402-410 extend in a direction of a center axis 412 to a boss plane parallel to the face plane of the camshaft wheel 204. The camshaft wheel 204 rotates about the center axis 412. Because the bosses 402-410 extend from the face plane to the boss plane, the camshaft sensor 130 may detect the change in magnetic flux caused by a boss. Accordingly, the camshaft sensor 130 may distinguish between the main body and the bosses 402-410.

In one embodiment, the bosses 402-410 are positioned about the main body of the camshaft wheel 204 such that opposite a boss on the main body of the camshaft wheel 204 there is no boss. Consider a first angular camshaft position 414 and a second angular camshaft position 416 that is 180° from the first angular camshaft position 414. The first boss 402 is present on the camshaft at the first angular camshaft position 414. Accordingly, there is not a boss at the second angular camshaft position 416. Therefore, the first boss 402 is circumferentially disposed about the camshaft wheel 204 such that the camshaft wheel 204 lacks a boss at a location opposite the first boss 402. Stated differently, the camshaft wheel 204 defines a diameter line 418 that extends through the first boss 402 and the center axis 412 such that the diameter line 418 lacks any other bosses other than the first boss 402, such that the diameter line 418 only intersects one boss. The total circumferential length of the bosses 402-410 may correspond to 180° of the 360° of the camshaft wheel 204.

The bosses may have different circumferential lengths. For example, the first boss 402 and the second boss 404 circumferentially extend for 15° of the 360° of the camshaft wheel 204, while the third boss 406, the fourth boss 408, and the fifth boss 410 may extend for 50° of the 360° of the camshaft wheel 204. While five bosses are described, more or fewer may be used. For example, a single boss may extend in a contiguous 180° of the camshaft wheels 204. As another example, ten bosses may extend axially from the main body of the camshaft wheel 204.

The vehicle sensors 126 may include, but are not limited to, image sensors, such as cameras, optical sensors, radio sensors, electromagnetic sensors, etc. mounted to the interior or exterior of the vehicle 200. The vehicle sensors 126 may detect characteristics of the engine, such as the position, timing, velocity, etc. of the components. Accordingly, the vehicle sensors 126 are operable to sense a measurement of data associated with the vehicle 200, the vehicle environment, and/or the vehicle systems 122, and generate a data signal indicating said measurement of data. These data signals may be converted into other data formats (e.g., numerical) and/or used by the vehicle systems 122 and/or the VCD 102 to generate other data metrics and parameters. For example, the data signals may convert the sensor data to values that may be used by the VCD 102. It is understood that the sensors may be any type of sensor, for example, acoustic, electric, magnetic, radio, environmental, optical, imaging, light, pressure, force, thermal, temperature, proximity, among others.

The VCD 102 is also operatively connected for computer communication to the network 132. It is understood that the connection from the I/O interface 110 and to the network 132 may be facilitated in various ways. For example, through a network connection (e.g., wired or wireless), a cellular data network from a portable device (not shown), a vehicle to vehicle ad-hoc network (not shown), an in-vehicle network (not shown), among others, or any combination of thereof. The network 132 is, for example, a data network, the Internet, a wide area network or a local area network. The network 132 serves as a communication medium to various remote devices (e.g., databases, web servers, remote servers, application servers, intermediary servers, client machines, other portable devices). For example, the VCD 102 may receive updates from a manufacturer database 134 using the network 132.

The application of systems for and methods for early camshaft position detection in an encoded crankshaft system are described with respect to the vehicle 200. As shown in FIG. 2, the vehicle 200 includes the operating environment 100, the crank pulse wheel 202, the crankshaft sensor 128, camshaft wheel 204, and the camshaft sensor 130 described above. In some embodiments, the crankshaft angular position of the crank pulse wheel 202 is determined based on electronic signals received from vehicle sensors 126 such as the crankshaft sensor 128. The crank pulse wheel 202 is associated with a cycle including a first crankshaft rotation and a second crankshaft rotation.

In one embodiment, the electronic signals identify the crankshaft angular position based on tooth encoding. For example, the crank pulse wheel 202 may have teeth, such as tooth 206, having a predetermined geometry defined by at least on tooth characteristic. However, the crank pulse wheel 202 is exemplary in nature and may have more or fewer teeth with different profiles, geometries, and/or configurations on the crank pulse wheel 202.

The crankshaft teeth may be encoded to indicate a specific angular position on the crank pulse wheel 202 which may be used to determine the position and timing of the engine of the vehicle 200. In particular, the teeth may have different geometries and be ordered such that when the VCD 102 reads a certain fixed number of consecutive teeth, the crankshaft angular position of the crank pulse wheel 202 may be determined. The order of the teeth on the crank pulse wheel 202 is patterned such that the crankshaft angular position of the crank pulse wheel 202 may be determined regardless of where on the crank pulse wheel 202 the reading began.

To determine the rotation the crank pulse wheel 202 in the cycle, the systems and methods also determine the position of the camshaft wheel 204. The position of the camshaft wheel 204 may be determined based on one or more bosses 402-410 extending in an axial direction from the main body of the camshaft wheel 204. For example, as discussed above, in a four-stroke embodiment, the camshaft wheel 204 turns once in the cycle while the crank pulse wheel 202 turns twice. The one or more bosses 402-410 may be positioned such that a first rotation of the crank pulse wheel 202 is associated with the presence of a boss, while the second rotation of the crank pulse wheel 202 is associated with the absence of a boss. Accordingly, the rotation of the crank pulse wheel 202 in the cycle may be determined based on the position of the crank pulse wheel 202 and the relative position of the camshaft wheel 204 without waiting for a full rotation of the slower of the camshaft wheel 204. Detailed embodiments describing exemplary methods using the system and network configuration discussed above will now be discussed in detail.

II. Application of Systems and Methods for Position Detection

Figure 5:
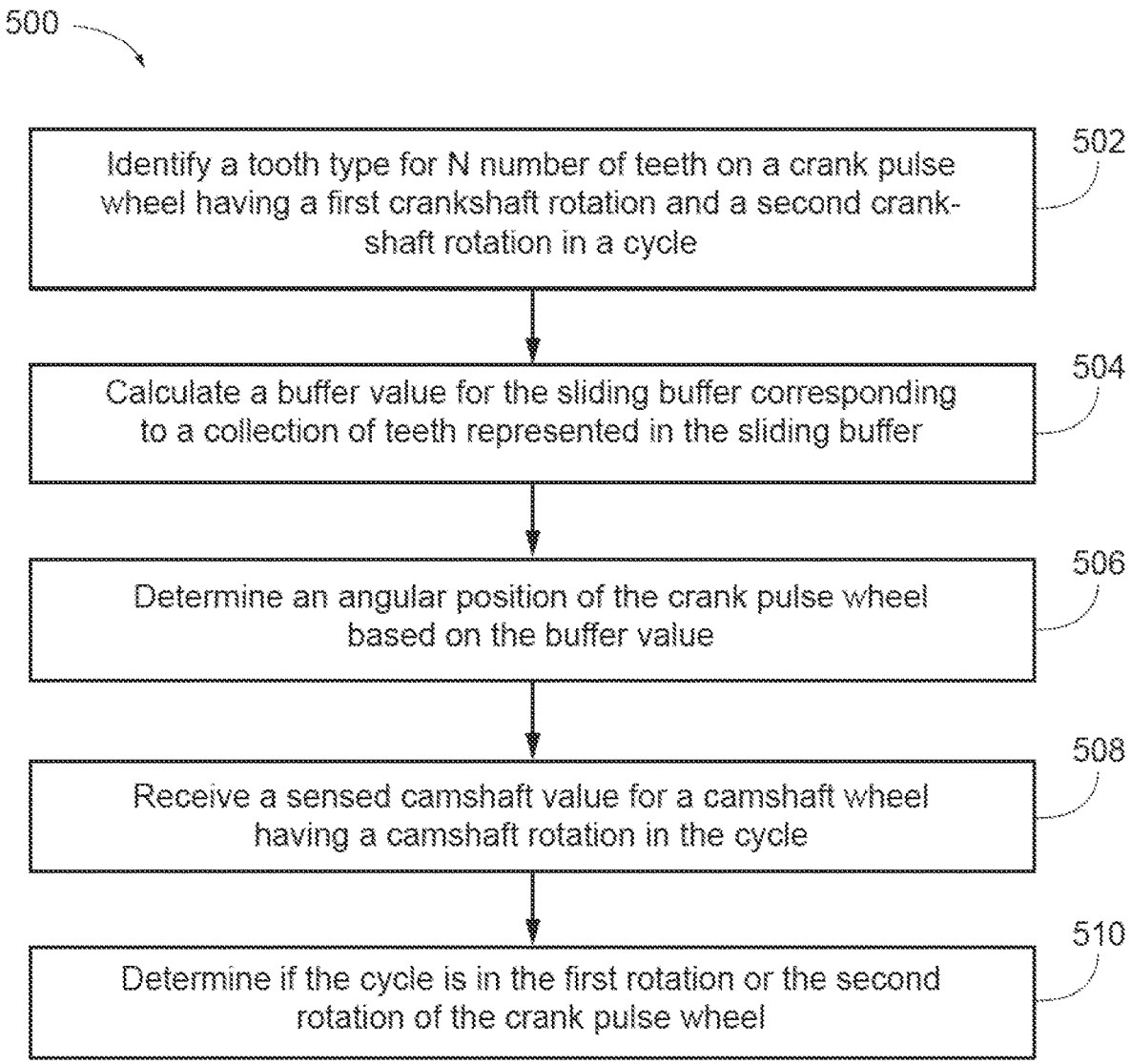
FIG. 5 is an example flow diagram of a method for early camshaft position detection in an encoded crankshaft system, according to one or more embodiments.

Referring now to FIG. 5, a method 500 for early camshaft position detection in an encoded crankshaft system will now be described according to an exemplary embodiment. FIG. 5 will be described with reference to FIGS. 1-4 and 6-13. As shown in FIG. 5, the method early camshaft position detection in an encoded crankshaft system is described according to a number of steps for simplicity, but it is understood that the elements of the method 500 may be organized into different architectures, blocks, stages, and/or processes.

At block 502, tooth types for N number of teeth of the crank pulse wheel 202 are identified based on at least one tooth characteristic. The identification processes described below are performed by, coordinated by, and/or facilitated by the read module 114. The at least one tooth characteristic is a physical geometric feature of at least some of the teeth on the crank pulse wheel 202 that make the teeth differentiable by the crankshaft sensor 128. In particular, the read module 114 receives sensor data from the crankshaft sensor 128 based on the geometry of the tooth.

In some embodiments, one or more of the geometries of the teeth of the crank pulse wheel 202 is held constant to facilitate detection by the crankshaft sensor 128 and/or identification by the read module 114. For example, here the height is the differential tooth characteristic, so the width of the teeth 314-336 may be held constant and/or the size of the gap between the teeth 314-336 may be held constant. The difference between the teeth 314-336 are based on the geometric differences in the teeth rather than the size of gaps.

The read module 114 identifies a tooth type according to the tooth characteristic for teeth in a sliding buffer. The sliding buffer includes N number of teeth. N is a positive integer less than a total number of teeth of the crank pulse wheel 202. In some embodiments, the read module 114 may identify a tooth type for each tooth in the sliding buffer. In other embodiments, the sliding buffer may include consecutive or a pattern of teeth, such as every other tooth, every third tooth, etc.

Turning to FIG. 6 is a crank tooth table 600 that includes crank tooth reference numbers corresponding to the characteristic values described with respect to FIG. 3. Accordingly, the crankshaft signal received by the read module 114 may include characteristic values for a series of sequential teeth. A buffer may be identified in the crankshaft signal. For example, the crank tooth table 600 has a first sliding buffer 602. Here, the first sliding buffer 602 includes the first tooth 314 with a characteristic value (1), the second tooth 316 with a characteristic value (3), and the third tooth 318 with a characteristic value (3). Accordingly, the first sliding buffer 602 has N equal to three such that the first sliding buffer includes the characteristic value for three consecutive teeth.

The sliding buffer may be incremented by one tooth, such that the read module 114 may begin anywhere on the crank pulse wheel 202. Accordingly, as the crank pulse wheel 202 turns the crankshaft sensor 128 may detect the next tooth such that the buffer include the most recently detect tooth. For example, turning to FIG. 7, is a crank tooth table 700 with a second sliding buffer 702. The second sliding buffer 702 does not begin at the fourth tooth 320, but instead includes the characteristic value of the second tooth 316. Likewise, the crank tooth table 800 of FIG. 8 illustrates a third sliding buffer 802 that begins at the third tooth 318.

Returning to FIG. 5, at block 504, a buffer value is calculated for the sliding buffer corresponding to a tooth represented in the sliding buffer. The buffer processes described below are performed by, coordinated by, and/or facilitated by the crankshaft module 116. The crankshaft module 116 may calculate the buffer value using different encoding types associated with numerical systems such as arrays, decimals, hexadecimals, binary, trinary, and transformations, among others. In some embodiments, the buffer value may be arbitrarily assigned and indexed in a crank tooth map. The buffer value may include a single parameter or multiple parameters. For example, the first sliding buffer 602 may have a first buffer value that is an array (1, 3, 3) corresponding to the characteristic values for each of the teeth in the first sliding buffer 602, as shown in FIG. 6. Alternatively, the first buffer value may use the (1, 3, 3) as the decimal value 133, the hexadecimal value 85, or the binary value 010000101. In another embodiment, the buffer value may be represented in decimal value (1, 3, 3) and the binary value (01, 11, 11) to conserve memory during operations.

At block 506, the method 500 includes determining a crankshaft angular position of the crank pulse wheel 202 based on the buffer value. The crankshaft module 116 may compare the buffer values to a listing of known angular positions. In particular, the crankshaft angular position may correspond to a tooth included in the sliding buffer. For example, the first buffer value (1, 3, 3) may be compared to a crank tooth map.

FIG. 9 is a crank tooth map 900 corresponding to FIGS. 6-8. The crank tooth map is a data look up table that may be accessed by the crankshaft module 116 to determine the crankshaft position based on the buffer value of a sliding buffer. The crank tooth map may be stored locally on the VCD 102 or remotely, such as at the manufacturer database 134 and accessed over the network 132. The crank tooth map 900 includes a tooth number row 902, a sliding buffer row 904, and a crankshaft angular position row 906. Rows 902-906 are merely exemplary and more or fewer rows with less or additional information may be included. For example, rather than an angle for the crankshaft angular position, the crank tooth table 800 may include an indexed numerical value to indicate the position of the crank pulse wheel 202. Continuing the example, from above, crankshaft module 116 may determine that the first sliding buffer 602 having the characteristic values (1), (3), and (3), in that order corresponds to the crankshaft angular position of 18° or the third tooth 318, as shown in FIG. 9.

Because each angular position on the crank pulse wheel 202 corresponds to a specific buffer value, the buffer values do not repeat. Therefore, the read module 114 only needs to identify the tooth characteristic for as many teeth on the crank pulse wheel 202 as are in the sliding buffer in order for the crankshaft module 116 to determine a position on the crank pulse wheel 202. For example, returning to FIG. 7, the crank tooth table 700 with a second sliding buffer 702 includes the second tooth 316 with a characteristic value (3), the third tooth 318 with a characteristic value (3), and the fourth tooth 320 with a characteristic value (2). Suppose the crankshaft module 116 calculates the second buffer value as (3, 3, 2) as shown in FIG. 9. The crankshaft module 116 may determine that the second buffer value (3, 3, 2) corresponds to a crankshaft angular position of 24° on the crank pulse wheel 202. Because the first buffer value (1, 3, 3) is different than the second buffer value (3, 3, 2), the crankshaft module 116 may distinguish between the crankshaft angular positions indicated by the first sliding buffer 602 and the second sliding buffer 702.

As another example, in FIG. 8, the crank tooth table 800 has a third sliding buffer 802 that includes the third tooth 318 with a characteristic value (3), the fourth tooth 320 with a characteristic value (2), and the fifth tooth 322 with a characteristic value (1). Suppose the crankshaft module 116 calculates the third buffer value as (3, 2, 1), then the crankshaft module 116 may determine that the third buffer value (3, 2, 1) corresponds to a crankshaft angular position of 30° on the crank pulse wheel 202. Because the first buffer value (1, 3, 3) is different than the second buffer value (3, 3, 2), which is different than the third buffer value (3, 2, 1) the crankshaft module 116 may distinguish between the crankshaft angular positions 18°, 24°, and 30° on the crank pulse wheel 202.

The VCD 102 may require a predetermined angular resolution in order to satisfy the functional requirements of the engine (not shown) of the vehicle 200. The angular resolution describes the precision and granularity with which the crankshaft angular position may be determined. In the example discussed above with respect to the FIGS. 3 and 6-9, the angular resolution is 6° because each tooth corresponds to a 6° increment around the crank pulse wheel 202. However, the angular resolution may be increased or decreased based on the number of teeth on the crank pulse wheel 202, N (the number characteristic values corresponding to the number of teeth represented in the sliding buffer), and/or the number the characteristic values that the crankshaft sensor 128 is capable of distinguishing between.

Suppose that the VCD 102 has a desired angular resolution of at least 4° to provide functionality for the vehicle systems 122 that drive the engine of the vehicle 200. Because there are 360° of rotation per revolution, to achieve an angular resolution of at least 4° the crank pulse wheel needs at least 90 teeth (assuming that the sensor may only distinguish between two tooth types). Once the total number of teeth is known, the number N of teeth in the sliding buffer may be determined based on the capability of the read module 114 to distinguish between characteristic values.

Suppose, the read module 114 is capable of a base 3 determination, meaning that the read module may distinguish between 3 different types of tooth geometry, such as the low, medium, high height example shown in FIG. 3. To afford each tooth of the crank pulse wheel 202 a unique buffer value, the number of teeth of the crank pulse wheel 202 should be less than or equal to the base, b, in this example a base of 3, to the power of N, the number of teeth represented by characteristic values in the sliding buffer.

Total Number of Teeth≤$b^N$

Suppose that the base is 3 and the N is 3, the base 3 to the power of 3 is 27. Because the number of teeth on the crank pulse wheel is 60, and 60 is greater than 27, the N being 3 is inadequate to provide each tooth of the crank pulse wheel 202 a unique buffer value. Now suppose that N is 4, base 3 to the power of 4 is 81. Because the number of teeth on the crank pulse wheel, 60, and 60 is less than 81, N being 4 is adequate to provide each tooth of the crank pulse wheel 202 a unique buffer value. Therefore, the read module 114 would determine the characteristic value, from at least 3 possible characteristic values, for at least four teeth in the sliding buffer to determine the crankshaft angular position of the crank pulse wheel 202 having 60 total teeth.

Figure 10:
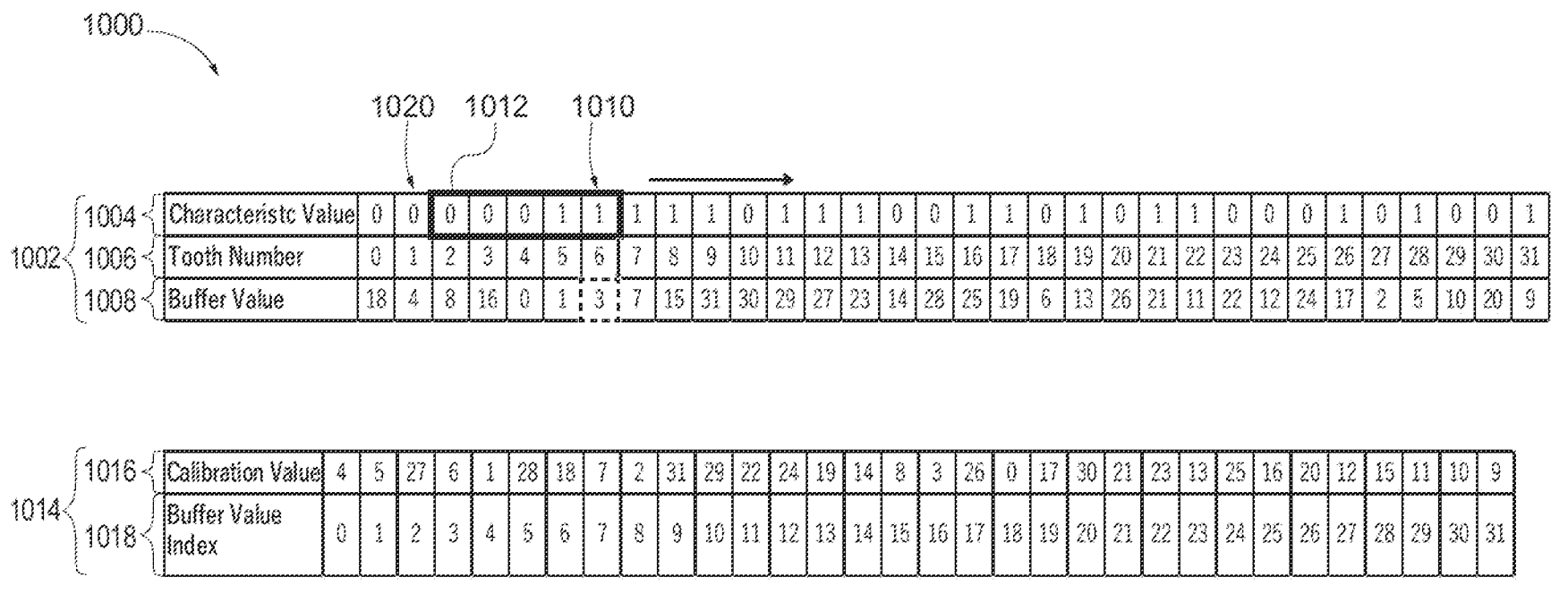

FIG. 10 is another crank tooth map corresponding to a crankshaft signal for an example crank pulse wheel 202 according to one or more embodiments. The crank tooth map 1000 includes a tooth table 1002 and a lookup table 1014. The tooth table 1002 includes a characteristic value row 1004, a tooth number row 1006, and a buffer value row 1008. The characteristic value row 1004 includes the characteristic values of the teeth. For example, in a column 1010, tooth 6, enumerated in the tooth number row, has a characteristic value of (1) shown in the characteristic value row 1004. However, the sliding buffer 1012 include more than a single characteristic value. Instead, the sliding buffer 1012 includes five characteristic values (0, 0, 0, 1, 1) identified by the read module 114. The crankshaft module 116 determines that the five characteristic values correspond to a buffer value, 3, associated with tooth 6. Thus, each tooth of the total number of teeth is associated with a corresponding buffer value.

The crankshaft module 116 uses the buffer value to determine the crankshaft angular position of the crank pulse wheel 202. In one embodiment, the crankshaft module 116 may use a table to determine the crankshaft angular position based on calibration value. For example, the lookup table 1014 includes a calibration value row 1016. Accordingly, the lookup table 1014 may store buffer values that are associated with corresponding angular positions of the crank pulse wheel 202.

Additionally, a buffer value index row 1018 is shown for convenience but may or may not be included in the look up table. For example, the crankshaft module 116 may use the buffer value, 3, to identify the tooth corresponding to the buffer value, here, tooth 6. The tooth number may then be used to identify the crankshaft angular position. For example, here the crankshaft angular position may correspond to the last tooth read in the sliding buffer as it may be where the crankshaft sensor 128 last detected the crank pulse wheel 202.

Because the crank pulse wheel 202 is turning, the sliding buffer is cyclical around the wheel. Suppose that the sliding buffer includes five characteristic values representing a tooth and the four preceding teeth. For example, tooth 1, in column 1020, has a sliding buffer that includes characteristic values (0, 0, 1, 0, 0) representing tooth 29, tooth 30, and tooth 31 as well as tooth 0 and tooth 1. Accordingly, the position module 120 may determine the crankshaft angular position as the crank pulse wheel 202 rotates even when the sliding buffer includes N teeth which is greater than the tooth number corresponding to the last tooth represented in the sliding buffer.

The crankshaft module 116 may broadcast the crankshaft angular position to one or more vehicle systems 122 of the vehicle 200 when the crankshaft angular position has been determined. For example, the crankshaft angular position may be broadcast to the fuel injection system 124. In particular, the fuel injection system 124 may deliver fuel to a combustion chamber (not shown) of the engine where the fuel is mixed with air for an intake stroke. The strokes of the engine must be precisely timed for the vehicle 200 to function correctly. Accordingly, the fuel injection system 124 may receive the crankshaft angular position to synchronize the functioning of one or more off the vehicle systems 122. The crankshaft angular position may also be requested by one or more vehicle systems 122 and transmitted in response to the request.

The crankshaft module 116 may broadcast the crankshaft angular position of the crank pulse wheel 202 using and an input/output (I/O) interface 110, the bus 112, the network 132 and/or other wired and wireless technologies. For example, the position module may transmit the crankshaft angular position to the manufacturer database via the network 132 for trouble-shooting, indexing, or experimental reasons. In another embodiment, the position module 120 may store the crankshaft angular position in a memory 106 such that the crankshaft angular position is accessible to other components.

Retuning to FIG. 5, at block 508, the method 500 includes receiving a sensed camshaft value for a camshaft wheel 204 having a camshaft rotation in the cycle. The camshaft value indicates the position of the camshaft wheel 204 in the cycle, such as the four-stroke cycle. For example, given a four-stroke engine, the camshaft wheel 204 turns once in a cycle for the two rotations of the crank pulse wheel 202.

Figure 11:
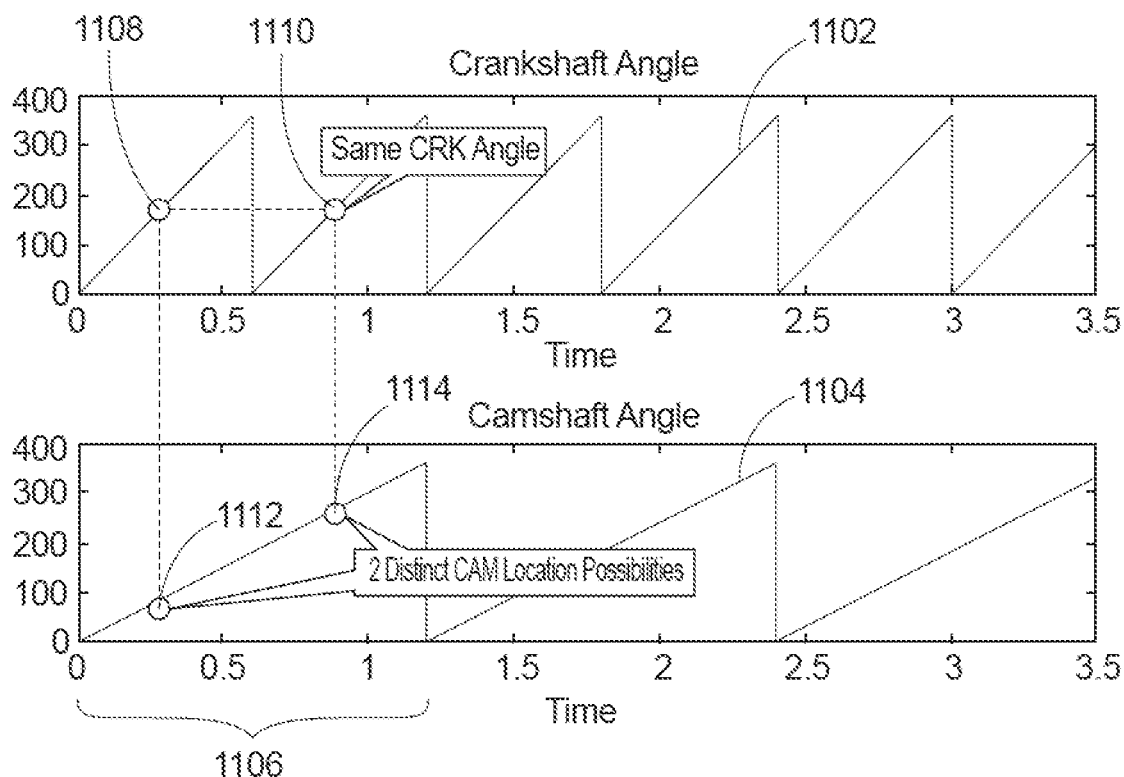
FIG. 11 is a timing diagram for early camshaft position detection in an encoded crankshaft system, according to one or more embodiments.

Turning to FIG. 11, a timing diagram 1100 includes a crankshaft angle wave 1102 and a camshaft angle wave 1104 that are aligned based on time. Given the four-stroke engine embodiment described above, a cycle 1106 includes two turns of the crank pulse wheel 202 indicated by two sawtooth waveforms of the crankshaft angle wave 1102. The cycle 1106 also includes a single sawtooth waveform of the camshaft angle wave 1104 which corresponds to the two sawtooth waveforms of the crankshaft angle wave 1102. As shown, in the four-stroke embodiment, for every two crankshaft rotations of the crank pulse wheel 202 the camshaft wheel 204 turns once.

Now suppose that a first crankshaft angular position 1108 of the crank pulse wheel 202 is 190° in the first crankshaft rotation corresponding to the first sawtooth waveform of the crankshaft angle wave 1102. Then, a second crankshaft angular position 1110 of the crank pulse wheel 202 is 190° in the second crankshaft rotation corresponding to the second sawtooth waveform of the crankshaft angle wave 1102. The crankshaft angular positions 1108 and 1110 of the crank pulse wheel 202 correspond to camshaft angular positions 1112 and 1114 of the camshaft wheel 204. For example, the first crankshaft angular position 1108 corresponds to a first angular camshaft position 1112 and the second crankshaft angular position 1110 corresponds to a second angular camshaft position 1114.

Because the camshaft wheel 204 rotates one time in the cycle 1106, the first angular camshaft position 1112 and the second angular camshaft position 1114 correspond to different angles of the camshaft wheel 204. Continuing the example from above, the first angular camshaft position 1112 may be 80° in the single camshaft rotation and the second angular camshaft position 1114 may be 260°. In this embodiment of the four-stroke engine, the second angular camshaft position 1114 is 180° from the first angular camshaft position 1112 because the camshaft wheel 204 rotates one time in the cycle 1106 and the crank pulse wheel 202 rotates twice. Accordingly, the camshaft angular position of the camshaft wheel 204 may be used to determine the crankshaft rotation of the crank pulse wheel 202. However, determining the camshaft angular position of the camshaft wheel 204 may be time intensive relative to determining the crankshaft angular position in the encoded crankshaft system described. Thus, rather than waiting to determine the angular camshaft position of the camshaft wheel 204, here, the camshaft wheel 204 is embossed with one or more bosses.

Returning to the camshaft wheel 204 of FIG. 4, the bosses 402-410 are positioned such that given a crankshaft angular position of the crank pulse wheel 202, a first rotation of the crank pulse wheel 202 corresponds with the presence of a boss on the camshaft wheel 204 but the second rotation of the crank pulse wheel 202 corresponds to the absence of a boss on the camshaft wheel 204. Accordingly, the first crankshaft rotation may be differentiated from the second crankshaft rotation based on the presence or absence of boss on the camshaft wheel 204. The bosses 402-410 are detected as a sensed camshaft value of a camshaft signal detected by the camshaft sensor 130.

Figure 12:
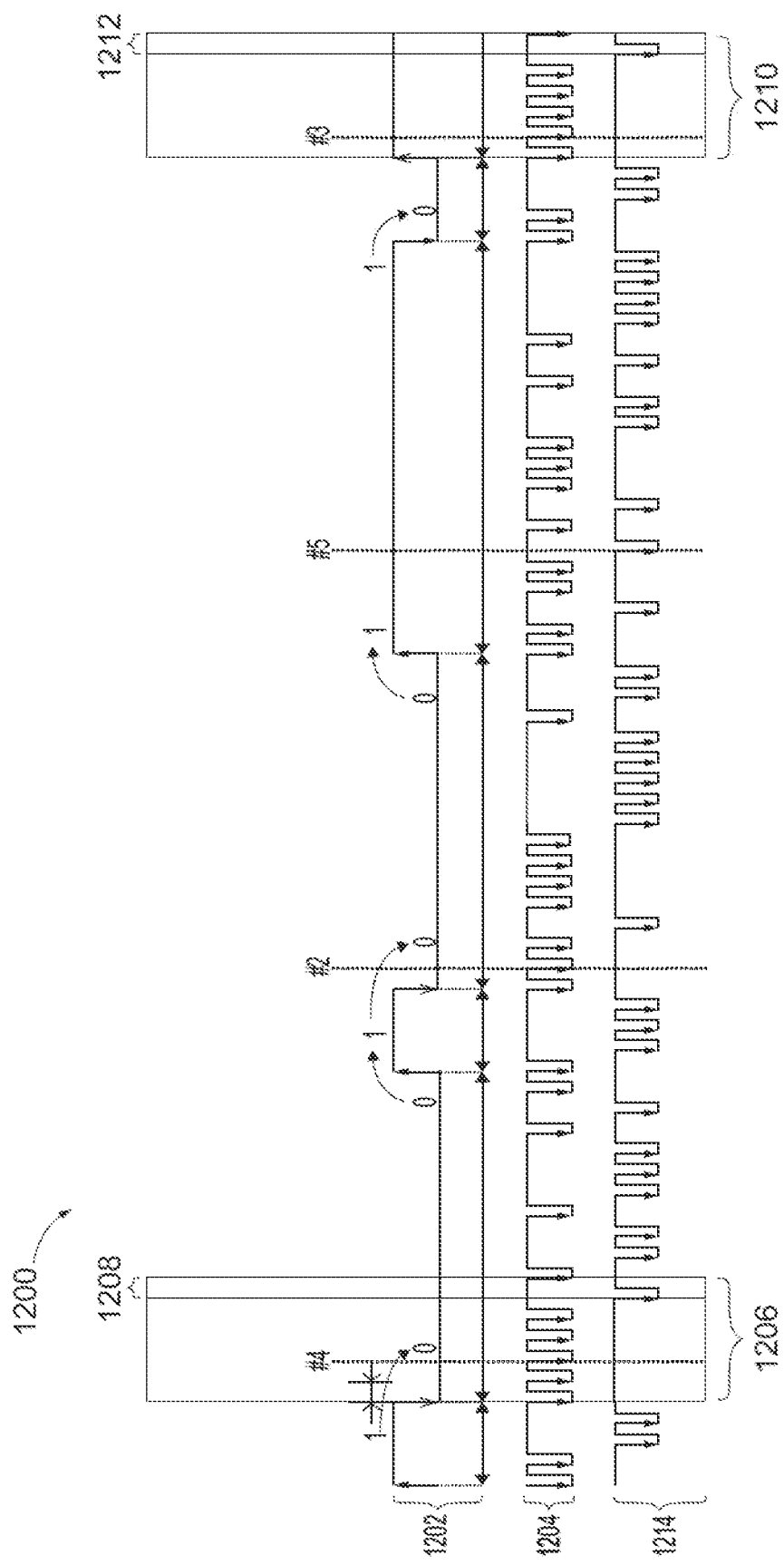
FIG. 12 is a pulse map for early camshaft position detection in an encoded crankshaft system, according to one or more embodiments.

Turning to FIG. 12, a pulse map 1200 including a camshaft signal 1202 and a crankshaft signals 1204 and 1214. The camshaft module 118 determines the sensed camshaft value based on the camshaft signal 1202 from the camshaft sensor 130. The camshaft sensor 130 detects the presence of a boss protruding in the radial direction from the main body of the camshaft wheel 204. The read module 114 receives sensor data from the camshaft sensor 130 as the camshaft signal 1202. For example, the camshaft signal 1202 may include a "1" when the camshaft sensor 130 detects a boss and a "0" when the camshaft sensor 130 does not detects a boss. Therefore, the camshaft signal 1202 may be a repeating square wave corresponding to turns of the camshaft wheel 204. Accordingly, the sensed camshaft value in this embodiment would either be a "1" or a "0" depending on the presence of a boss.

At block 510, the method 500 includes determining if the cycle is in the first crankshaft rotation or the second crankshaft rotation of the crank pulse wheel 202 based on the sensed camshaft value. In one embodiment, the position module 120 may access a look-up table or other reference media, such as Table 1 below.

| Crankshaft Angular Position | Sensed Camshaft Value | Crankshaft Rotation |
| --- | --- | --- |
| 35° | 0 | First |
| 35° | 1 | Second |
| 36° | 0 | First |
| 36° | 1 | Second |
| 37° | 0 | Second |
| 37° | 1 | First |

As discussed above, the read module 114 receives the crankshaft signal 1204 and 1214 from the crankshaft sensor 128. For example, a first sliding buffer 1206 of the crankshaft signal 1204 may be a binary signal having six falling edges. Corresponding to the first sliding buffer 1206, the camshaft sensor 130 detects a first camshaft value 1208. Suppose that the first sliding buffer 1206 corresponds to a crankshaft angular position of 36° and the first camshaft value 1208 is 0 corresponding to the absence of a boss. Then then the position module 120 determines that crank pulse wheel 202 is in the first rotation, based for example, on the look-up table, Table 1.

In a second sliding buffer 1210, the crankshaft signal 1204 has the same pattern of six falling edges as shown in the first sliding buffer 1206 of the crankshaft signal 1204. Accordingly, the second sliding buffer 1210 also corresponds to a crankshaft angular position of 36°. However, the camshaft sensor 130 detects a second camshaft value 1212 of "1." Then the position module 120 determines that the crank pulse wheel 202 is in the second rotation. Accordingly, the rotation of the crank pulse wheel 202 may be determined based on a crankshaft signal 1204 and 1214 detected based on the position of the crank pulse wheel 202 and a camshaft signal 1202 detected based on the position of the camshaft wheel 204 without waiting for the slower rotation of the camshaft wheel 204. In embodiments in which the crank pulse teeth have multiple tooth characteristics, a second crankshaft signal may be received from a second crankshaft sensor for determining the angular position of the crank pulse wheel 202.

Figure 13:
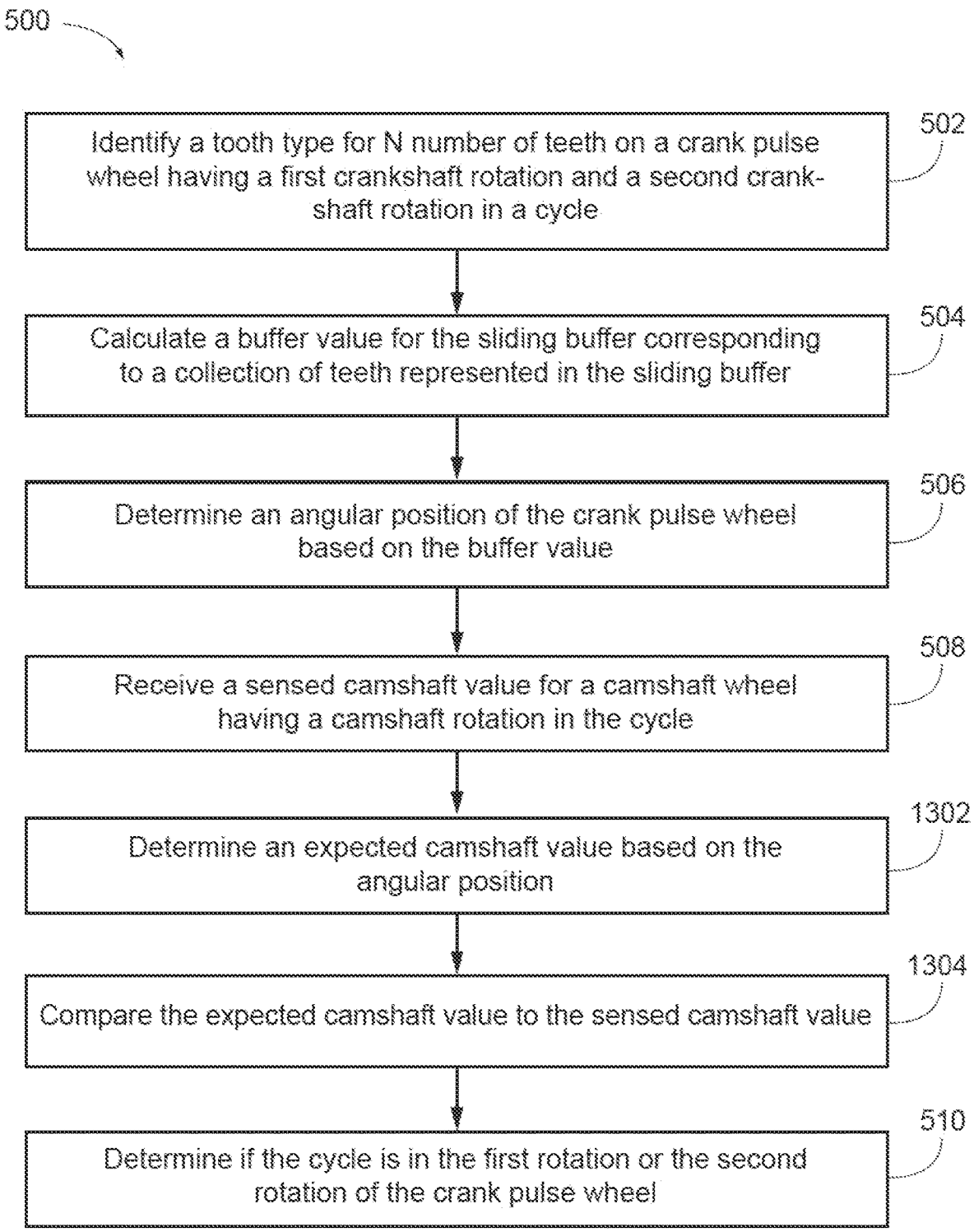
FIG. 13 is another example flow diagram of a method for early camshaft position detection in an encoded crankshaft system, according to one or more embodiments.

Referring now to FIG. 13, a method 1300 for early camshaft position detection in an encoded crankshaft system will now be described according to an exemplary embodiment. The method 1300 includes similar steps as method 500 and operate in a similar manner as described above. For example, at block 502, tooth types for N number of teeth of the crank pulse wheel 202 are identified based on at least one tooth characteristic. At block 504, a buffer value is calculated for the sliding buffer corresponding to a tooth represented in the sliding buffer. At block 506, the method 1300 includes determining a crankshaft angular position of the crank pulse wheel 202 based on the buffer value. At block 508, the method 1300 includes receiving a sensed camshaft value for a camshaft wheel 204 having a camshaft rotation in the cycle.

At block 1302, the method 1300 includes determining an expected camshaft value based on the sensed crankshaft angular position. For example, the camshaft module 118 may determine the expected camshaft value based on a default camshaft value, a previously known camshaft value, and/or the crankshaft angular position.

At block 1304, the method 1300 includes the position module 120 comparing the expected camshaft value to the sensed camshaft value. Suppose that the camshaft module 118 has the default camshaft value of "0" indicating that there is no boss and the camshaft value is "0" corresponding to the absence of a boss. Then the comparison may result in an affirmative result or "true" result. Conversely, suppose that the camshaft module 118 has the default camshaft value of "0" indicating that there is no boss and the camshaft value is "1" corresponding to the presence of a boss. Then the comparison may result in a negative result or "false" result.

At block 510, the method 500 includes determining if the cycle is in the first crankshaft rotation or the second crankshaft rotation of the crank pulse wheel 202 based on the comparison of the sensed camshaft value and the expected camshaft value. For example, if the result of the comparison is the affirmative or "true" result, then the crank pulse wheel 202 is in the first crankshaft rotation, whereas if the result of the comparison is the negative or "false" result, then the crank pulse wheel 202 is in the second crankshaft rotation. Thus, the rotation of the crank pulse wheel 202 may be determined based on determining the position of the crank pulse wheel 202 and the camshaft wheel 204.

The position of the crank pulse wheel 202 is determined based on encoding tooth characteristics of the teeth of the crank pulse wheel 202. The position of the camshaft wheel 204 is determined as a function of bosses embossed on the camshaft wheel 204 such that the position of the camshaft wheel 204 can be determined within the crankshaft position detection period. Furthermore, the rotation of the crank pulse wheel 202 can be determined without waiting for the slower rotation of the camshaft wheel 204, which improves the efficiency and responsiveness of the vehicle 200. Additionally, because fewer teeth of the encoded crank pulse wheel 202 need to be detected to determine the crankshaft angular position and the position of the camshaft wheel 204 can be determined instantaneously once crankshaft position is determined, the systems and methods described herein reduce the amount of sensing and processing performed by the VCD 102 and/or the vehicle sensors 126.

Figure 14:
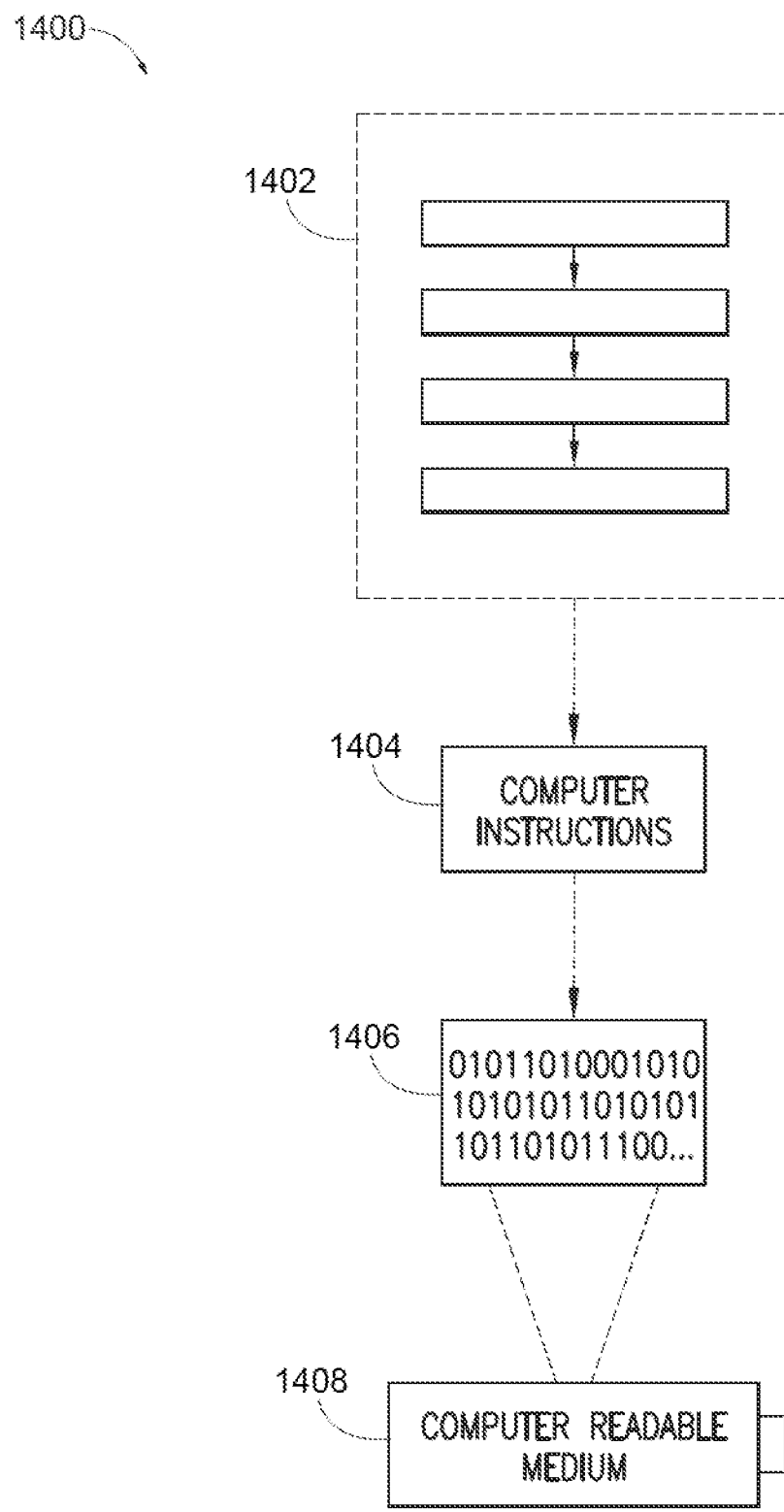
FIG. 14 is an illustration of an example computer-readable medium or computer-readable device including processor-executable instructions configured to embody one or more of the provisions set forth herein, according to one embodiment.

Still another aspect of the systems and methods for early camshaft position detection in an encoded crankshaft system involves a computer-readable medium including processor-executable instructions configured to implement one aspect of the techniques presented herein. An aspect of a computer-readable medium or a computer-readable device devised in these ways is illustrated in FIG. 14, wherein an implementation 1400 includes a computer-readable medium 1408, such as a CD-R, DVD-R, flash drive, a platter of a hard disk drive, etc., on which is encoded computer-readable data 1406. This encoded computer-readable data 1406, such as binary data including a plurality of zero's and one's as shown in 1406, in turn includes a set of processor-executable computer instructions 1404 configured to operate according to one or more of the principles set forth herein. In this implementation, the processor-executable computer instructions 1404 may be configured to perform a method 1402, such as the method 500 of FIG. 5 and the method 1300 of FIG. 13.

In another aspect, the processor-executable computer instructions 1404 may be configured to implement a system, such as the operating environment of FIG. 1. Many such computer-readable media may be devised by those of ordinary skill in the art that are configured to operate in accordance with the techniques presented herein.

The term "computer readable media" as used herein includes computer storage media. Computer storage media includes volatile and nonvolatile, removable and non-removable media implemented in any method or technology for storage of information such as computer readable instructions or other data. Memory 106 and data store 108 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for early camshaft position detection in an encoded crankshaft system, the system comprising:
   a processor; and
   a memory configured to store instructions that when executed by the processor cause the processor to:
   determine a crankshaft angular position of a crank pulse wheel based on electronic signals received from vehicle sensors, wherein the crank pulse wheel is associated with an engine cycle including a first crankshaft rotation and a second crankshaft rotation;
   receive a sensed camshaft value for a camshaft wheel having a camshaft rotation in the engine cycle based on a camshaft signal from a camshaft sensor, wherein the engine cycle is defined by a single camshaft rotation and the first crankshaft rotation and the second crankshaft rotation;
   determine if the engine cycle is in the first crankshaft rotation or the second crankshaft rotation of the crank pulse wheel based on the crankshaft angular position of the crank pulse wheel and the sensed camshaft value; and
   control engine operation based on the determination of whether the engine cycle is in the first crankshaft rotation or the second crankshaft rotation of the crank pulse wheel,
   wherein the electronic signals identify a tooth type for N number of teeth on the crank pulse wheel in a sliding buffer based on at least one tooth characteristic, wherein N is a positive integer less than a total number of teeth of the crank pulse wheel, and wherein the instructions further cause the processor to:
   calculate a buffer value for the sliding buffer corresponding to the N number of teeth represented in the sliding buffer.

2. The system of claim 1,
   wherein each tooth of the total number of teeth is associated with a corresponding buffer value, and wherein buffer values are unique.

3. The system of claim 2, wherein the N number of teeth in the sliding buffer is based on an encoding type.

4. The system of claim 3, wherein the encoding type represents the at least one tooth characteristic as one of a number of characteristic values.

5. The system of claim 1, wherein the processor is further configured to execute instructions that cause the processor to:
determining an expected camshaft value based on the crankshaft angular position; and
comparing, in a comparison, the expected camshaft value to the sensed camshaft value, wherein determining if the engine cycle is in the first crankshaft rotation or the second crankshaft rotation of the crank pulse wheel based on the comparison of the expected camshaft value and the sensed camshaft value.

6. The system of claim 5, wherein the expected camshaft value is a default camshaft value.

7. The system of claim 5, wherein a result of the comparison is an affirmative result or a negative result, wherein the affirmative result and the negative result correspond to the first crankshaft rotation and the second crankshaft rotation.

8. A method for early camshaft position detection in an encoded crankshaft system, the method comprising:
identifying a tooth type for N number of teeth on a crank pulse wheel in a sliding buffer based on at least one tooth characteristic, wherein N is a positive integer less than a total number of teeth of the crank pulse wheel, and wherein the crank pulse wheel has a first crankshaft rotation and a second crankshaft rotation in an engine cycle;
calculating a buffer value for the sliding buffer corresponding to the N number of teeth represented in the sliding buffer;
determining a crankshaft angular position of the crank pulse wheel based on the buffer value;
receiving a sensed camshaft value for a camshaft wheel having a camshaft rotation in the engine cycle based on a camshaft signal from a camshaft sensor, wherein the engine cycle is defined by a single camshaft rotation and the first crankshaft rotation and the second crankshaft rotation;
determining if the engine cycle is in the first crankshaft rotation or the second crankshaft rotation of the crank pulse wheel based on the crankshaft angular position of the crank pulse wheel and the sensed camshaft value; and
controlling engine operation based on the determination of whether the engine cycle is in the first crankshaft rotation or the second crankshaft rotation of the crank pulse wheel.

9. The method of claim 8, wherein each tooth of the total number of teeth is associated with a corresponding buffer value, and wherein buffer values are unique.

10. The method of claim 8, wherein buffer values are associated with corresponding angular positions.

11. The method of claim 10, wherein the buffer values and corresponding angular positions are stored in a lookup table.

12. The method of claim 8, further comprising:
determining an expected camshaft value based on the crankshaft angular position; and
comparing, in a comparison, the expected camshaft value to the sensed camshaft value, wherein determining if the engine cycle is in the first crankshaft rotation or the second crankshaft rotation of the crank pulse wheel based on the comparison of the expected camshaft value and the sensed camshaft value.

13. The method of claim 12, wherein the expected camshaft value is a default camshaft value.

14. The method of claim 12, wherein a result of the comparison is an affirmative result or a negative result, wherein the affirmative result and the negative result correspond to the first crankshaft rotation and the second crankshaft rotation.

15. A non-transitory computer-readable storage medium storing instructions that, when executed by a computer, causes the computer to perform a method for early camshaft position detection in an encoded crankshaft system comprising:
identifying a tooth type for N number of teeth on a crank pulse wheel in a sliding buffer based on at least one tooth characteristic, wherein N is a positive integer less than a total number of teeth of the crank pulse wheel, and wherein the crank pulse wheel has a first crankshaft rotation and a second crankshaft rotation in an engine cycle;
calculating a buffer value for the sliding buffer corresponding to the N number of teeth represented in the sliding buffer;
determining a crankshaft angular position of the crank pulse wheel based on the buffer value;
receiving a sensed camshaft value for a camshaft wheel having a camshaft rotation in the engine cycle based on a camshaft signal from a camshaft sensor, wherein the cycle is defined by a single camshaft rotation and the first crankshaft rotation and the second crankshaft rotation;
determining if the engine cycle is in the first crankshaft rotation or the second crankshaft rotation of the crank pulse wheel based on the crankshaft angular position of the crank pulse wheel and the sensed camshaft value; and
controlling engine operation based on the determination of whether the engine cycle is in the first crankshaft rotation or the second crankshaft rotation of the crank pulse wheel.

16. The non-transitory computer-readable storage medium of claim 15, wherein each tooth of the total number of teeth is associated with a corresponding buffer value, and wherein buffer values are unique.

17. The non-transitory computer-readable storage medium of claim 15, wherein the N number of teeth in the sliding buffer is based on an encoding type.

18. The non-transitory computer-readable storage medium of claim 15, wherein the method further comprises:
determining an expected camshaft value based on the crankshaft angular position; and
comparing, in a comparison, the expected camshaft value to the sensed camshaft value, wherein determining if the engine cycle is in the first crankshaft rotation or the second crankshaft rotation of the crank pulse wheel based on the comparison of the expected camshaft value and the sensed camshaft value.

19. The non-transitory computer-readable storage medium of claim 18, wherein the expected camshaft value is a default camshaft value.

20. The non-transitory computer-readable storage medium of claim 18, wherein a result of the comparison is an affirmative result or a negative result, wherein the affirmative result and the negative result correspond to a first crankshaft rotation and the second crankshaft rotation.

* * * * *